US011939023B2

(12) United States Patent
Vandenbussche et al.

(10) Patent No.: US 11,939,023 B2
(45) Date of Patent: Mar. 26, 2024

(54) MICROMOBILITY ELECTRIC VEHICLE CARGO HANDLING

(71) Applicant: Lyft, Inc., San Francisco, CA (US)

(72) Inventors: Gregoire Ludovic Vincent Vandenbussche, San Francisco, CA (US); Peter Rex Luedtke, Brooklyn, NY (US); Daniel Lami Goldstein, Berkeley, CA (US)

(73) Assignee: Lyft, Inc., San Francisco, CA (US)

( * ) Notice: Subject to any disclaimer, the term of this patent is extended or adjusted under 35 U.S.C. 154(b) by 939 days.

(21) Appl. No.: 16/579,627

(22) Filed: Sep. 23, 2019

(65) Prior Publication Data

US 2021/0086862 A1     Mar. 25, 2021

(51) Int. Cl.
  *B62K 19/46*     (2006.01)
  *B62J 7/02*      (2006.01)
  *B62J 7/08*      (2006.01)

(52) U.S. Cl.
  CPC ............... *B62K 19/46* (2013.01); *B62J 7/02* (2013.01); *B62J 7/08* (2013.01); *B62K 2202/00* (2013.01)

(58) Field of Classification Search
  CPC ....... B62J 7/02; B62J 7/08; B62J 11/05; B62J 11/22; B62J 11/00; B62K 19/46; B62K 2204/00; B62K 2202/00; B62K 3/002; B62K 11/10
  See application file for complete search history.

(56) References Cited

U.S. PATENT DOCUMENTS

| 3,424,418 | A | * | 1/1969 | Freedman ................ B60R 7/10 224/927 |
|---|---|---|---|---|
| 7,898,439 | B2 | | 3/2011 | Bettez et al. |
| 9,076,136 | B2 | | 7/2015 | Bettez et al. |
| 9,269,236 | B2 | | 2/2016 | Bettez et al. |
| 9,598,128 | B2 | | 3/2017 | Assénat et al. |
| 11,465,021 | B2 | * | 10/2022 | Martínez Fierro ...... B62J 43/28 |
| 2009/0240575 | A1 | | 9/2009 | Bettez et al. |
| 2010/0228405 | A1 | | 9/2010 | Morgal et al. |

(Continued)

FOREIGN PATENT DOCUMENTS

| CN | 205 440 663 | 8/2016 |
|---|---|---|
| TW | M 579 417 | 6/2019 |

(Continued)

OTHER PUBLICATIONS

U.S. Appl. No. 16/391,294, Bromwich et al., filed Apr. 22, 2019.

(Continued)

*Primary Examiner* — Corey N Skurdal
(74) *Attorney, Agent, or Firm* — Baker Botts L.L.P.

(57) ABSTRACT

A micromobility electric vehicle includes a front storage volume and a rear storage volume. The front storage volume may be defined on two sides by an angled footboard portion and a column. The rear storage volume may be defined on two sides by a curved footboard portion and a seat post. Retainers including an elastic member may be employed in the front and/or rear storage volume to releasably secure objects of different sizes and shapes in the front or rear storage volumes. Hooks may be employed in the front and/or rear storage volumes to allow an object with a strap to be supported in the front or rear storage volume.

30 Claims, 13 Drawing Sheets

(56) References Cited

U.S. PATENT DOCUMENTS

| | | | |
|---|---|---|---|
| 2011/0057431 A1* | 3/2011 | Yamazaki | B62J 7/02 280/769 |
| 2011/0161141 A1 | 6/2011 | Bettez et al. | |
| 2015/0112478 A1 | 4/2015 | Bettez et al. | |
| 2015/0152668 A1 | 6/2015 | Assénat et al. | |
| 2017/0036722 A1 | 2/2017 | Assénat et al. | |
| 2018/0319368 A1 | 11/2018 | Keating et al. | |
| 2019/0127002 A1 | 5/2019 | Bettez et al. | |
| 2019/0206009 A1 | 7/2019 | Gibson et al. | |
| 2019/0248439 A1 | 8/2019 | Wang | |

FOREIGN PATENT DOCUMENTS

| WO | WO 2014/154295 | 10/2014 |
|---|---|---|
| WO | WO 2018/056819 | 3/2018 |

OTHER PUBLICATIONS

U.S. Appl. No. 16/448,660, Lambert et al., filed Jun. 21, 2019.
U.S. Appl. No. 16/578,995, Vandenbussche et al., filed Sep. 23, 2019.
U.S. Appl. No. 16/579,530, Van Houten et al., filed Sep. 23, 2019.
U.S. Appl. No. 16/579,556, Van Houten et al., filed Sep. 23, 2019.
U.S. Appl. No. 29/706,673, Van Houten et al., filed Sep. 23, 2019.
U.S. Appl. No. 29/706,676, Van Houten et al., filed Sep. 23, 2019.
U.S. Appl. No. 29/706,678, Van Houten et al., filed Sep. 23, 2019.
U.S. Appl. No. 29/706,682, Van Houten et al., filed Sep. 23, 2019.
[No Author Listed], And then there was Two. Bird Two. Bird Rides, Inc. 2019. 8 pages URL:https://two.bird.co [last accessed Sep. 26, 2019].
International Search Report and Written Opinion, PCT/US2020/051665 dated Nov. 17, 2020, 17 pages.
International Search Report and Written Opinion, PCT/US2020/051666 dated Nov. 19, 2020, 17 pages.

* cited by examiner

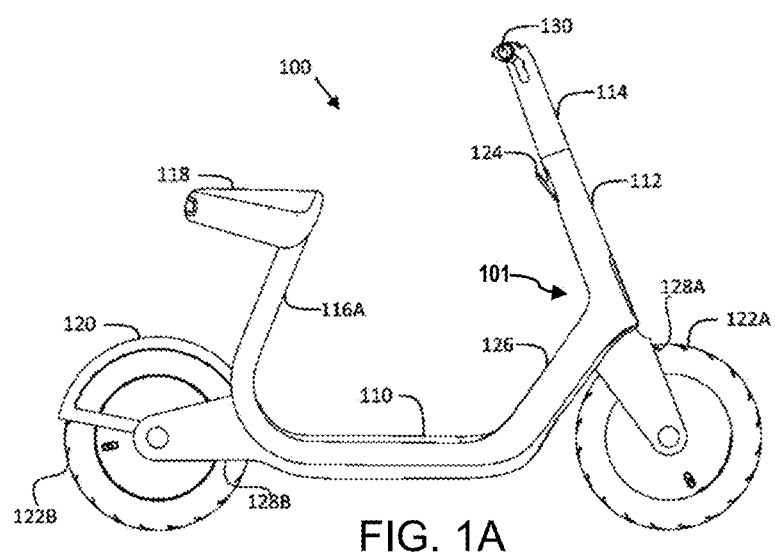
FIG. 1A
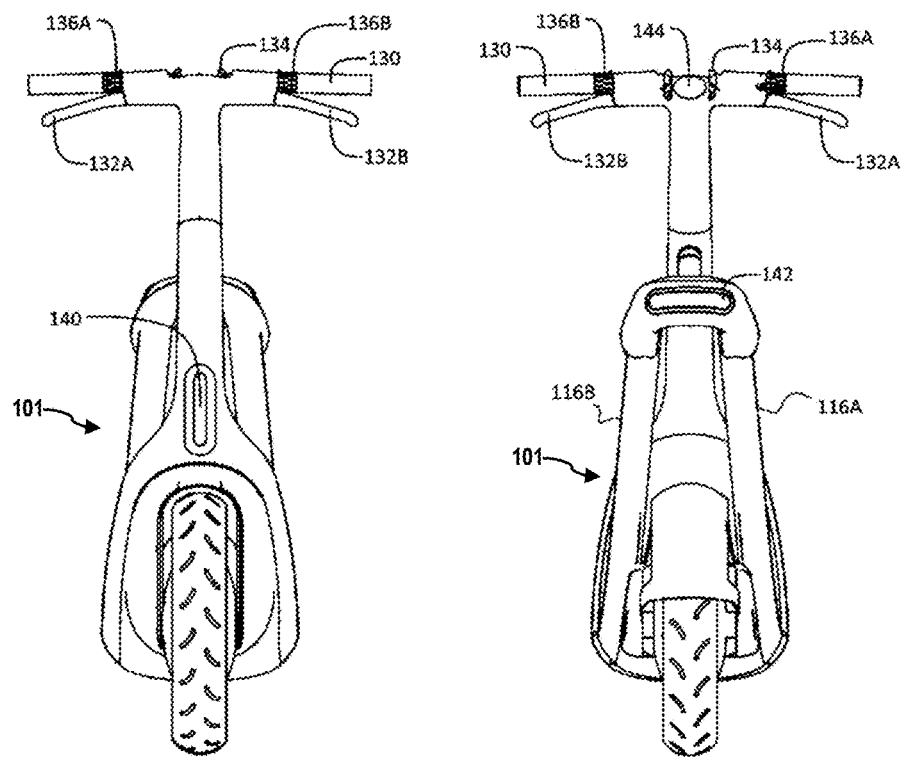
FIG. 1B
FIG. 1C

MICROMOBILITY ELECTRIC VEHICLE CARGO HANDLING

BACKGROUND

Conventional transportation options in urban environments include public transportation (e.g., subways, busses), large vehicles such as cars (e.g., personal vehicles, taxis, ride-share services), bicycles, and walking. More recently, so-called "micromobility" shareable/rentable vehicles such as docked and dockless scooters and bicycles have become more common, improving access and allowing users additional options for traveling more quickly over shorter distances than walking typically allows.

SUMMARY

Having a variety of different transportation options improves users' lives by increasing mobility and enabling users to select the transportation option that works best for them on any given trip. For users desiring to travel relatively short distances (e.g., less than 5 miles), micromobility transportation options provide convenient and environmentally-friendly alternatives to car-based travel. Micromobility transportation options include human-powered vehicles (e.g., bicycles, scooters) and vehicles with electric motors (e.g., electric bicycles, electric scooters), all of which are designed to be used primarily within the traditional bicycle lane infrastructure.

Within the micromobility transportation category, different transportation options may be more suitable for certain types of trips than others. For example, while a stand-up scooter may work well for short distances, a vehicle that allows the user to be seated (e.g., a bicycle) may work better for longer distances. Micromobility vehicles with electric motors such as electric bicycles and electric scooters prevent rider fatigue and assist with navigating hilly terrain. Additionally, the purpose of each trip may dictate which type of transportation option a user selects. For example, a daily commuter carrying nothing or only a small bag may select a transportation option that emphasizes speed over stability, whereas a user traveling to a store to pick up a package or groceries may select a transportation option emphasizing package storage and security rather than speed.

The inventors have recognized that most conventional micromobility transportation options are not well suited for moderate distance (e.g., 2-5 mile) trips, which are among the most common trips in an urban environment. For example, riding a bicycle or standing on a scooter and engaging a thumb accelerator for more than 1-2 miles may become tiresome for a user, and may result in the user not selecting those transportation options for such a trip. To this end, some embodiments are directed to an electric vehicle designed to accommodate such moderate distance trips across a variety of terrains to enhance the user's experience, comfort, and enjoyment while riding the vehicle.

In some embodiments, a micromobility electric vehicle includes a footboard having a bottom portion configured to extend between a front wheel and a rear wheel and an angled portion extending at an angle from the bottom portion of the footboard. The electric vehicle also includes a frame disposed at an edge of the angled portion of the footboard such that the angled portion of the footboard is recessed below a top edge of the frame, where the frame includes a column extending from the angled portion of the footboard toward handlebars of the vehicle. The electric vehicle also includes a hook disposed on the column, where the column, the angled portion of the footboard, and the hook at least partially define a front storage volume of the electric vehicle.

In some embodiments, a micromobility electric vehicle includes a footboard having a bottom portion configured to extend between a front wheel and a rear wheel and a rear portion extending from the bottom portion of the footboard. The electric vehicle also includes a frame disposed at an edge of the rear portion of the footboard such that the rear portion of the footboard is recessed below a top edge of the frame, where the frame includes a seat post, where the rear portion of the footboard extends from the bottom portion of the footboard to the seat post, and where the seat post extends from the rear portion of the footboard toward a seat of the electric vehicle. The rear portion of the footboard and the seat post at least partially define a rear storage volume of the electric vehicle.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

Various non-limiting embodiments of the technology will be described with reference to the following figures. It should be appreciated that the figures are not necessarily drawn to scale.

FIG. 1A illustrates a first side view of an electric vehicle in accordance with some embodiments;

FIG. 1B illustrates a right side view of the electric vehicle of FIG. 1A;

FIG. 1C illustrates a rear view of the electric vehicle of FIG. 1A;

DETAILED DESCRIPTION

Figure 1D:
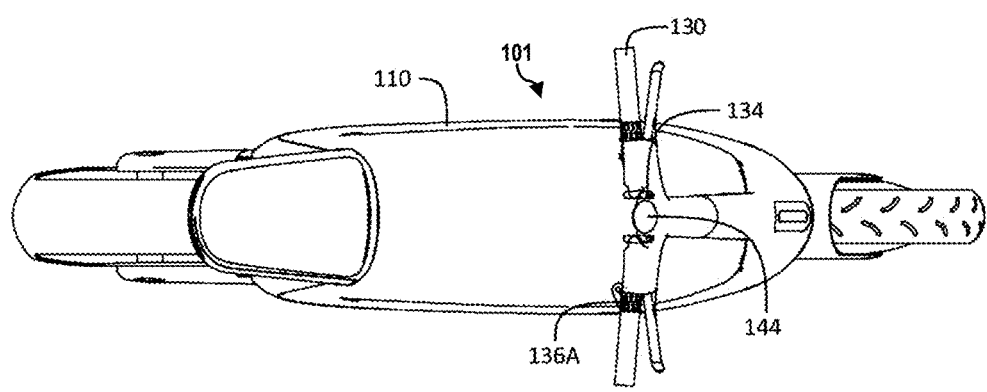
FIG. 1D illustrates a top view of the electric vehicle of FIG. 1A.
Figure 1E:
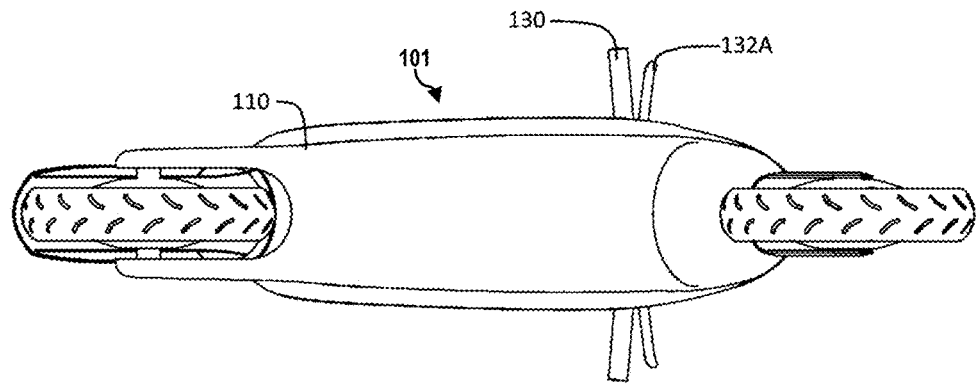
FIG. 1E illustrates a bottom view of the electric vehicle of FIG. 1A.

As discussed briefly above, most conventional micromobility transportation options are designed for short distance (e.g., 0-2 mile) trips, and are less comfortable for the user when used for moderate distance (e.g., 2-5 mile) trips. Some embodiments are directed to a micromobility electric vehicle and one or more features thereof that provide a safe, reliable, and approachable user experience for moderate distance trips. These electric vehicles may be accessible as part of a shared vehicle model in which riders do not have a personal vehicle, but instead interact with a dynamic matching system to access, under a rental or subscription model, any of numerous such electric vehicles deployed throughout a region, such as a city.

The inventors have recognized and appreciated that it may be desirable to store objects such as purses, backpacks, shoulder bags, duffel bags, briefcases, tote bags, shopping bags, and other personal effects secure to a micromobility vehicle for moderate distance trips. Additionally, it can be appreciated that it may be desirable to store multiple objects on a micromobility vehicle in cases where the micromobility vehicle is used for errands or shopping trips, retrieving takeout, or travel to a gym, for example. Furthermore, it can be appreciated that it is desirable for stored items on a micromobility vehicle to not interfere with the operation of the vehicle while providing ample space for objects of various sizes and shapes.

Accordingly, in some embodiments, a micromobility vehicle may include multiple (e.g., front and rear) storage volumes to accommodate objects of various sizes, shapes, and types. In one embodiment, a micromobility vehicle includes a footboard extending between a front wheel and a second wheel. The footboard may include a front angled footboard portion which extends from a bottom portion of the footboard upwards and forwards toward the front wheel of the vehicle. The footboard may also include a rear curved or angled footboard portion which extends upwards and rearwards from the bottom portion of the footboard toward the rear wheel. The vehicle may include a frame which extends upwards from the front angled footboard portion and the rear curved or angled footboard portion. The frame may include a column (e.g., head tube) which extends upwards and rearwards from the front angled footboard portion. In such an arrangement, the column and angled footboard portion may define two sides of a front storage volume. The frame may include at least one seat post which extends upwards and forward from the rear curved or angled footboard portion. In such an arrangement, the seat post and rear curved or angled footboard portion may define two sides of a rear storage volume. In some embodiments, the front angled footboard portion and the rear curved or angled footboard portion are recessed relative to the frame, such that the frame facilitates securing an object stored in the front or rear storage volumes.

It can be appreciated that it may be desirable to secure an object stored on a micromobility vehicle to a rigid portion of the vehicle such as a portion of the footboard or frame. As one example, it can be appreciated that it may be desirable to prevent soft bags (e.g., tote bags, shopping bags, etc.) from swinging or sliding when suspended from a hook. As another example, it can be appreciated that it may be desirable to secure bulky objects (e.g., a box, crate, etc.) to a micromobility vehicle to prevent shifting or sliding of the object during travel. It can be appreciated that a retainer capable of securing packages and objects of many different shapes and sizes (also referred to herein as a "universal retainer") may be desirable to accommodate objects in these circumstances and others, such that the micromobility vehicle is not limited to transporting specific objects.

Accordingly, in some embodiments, a front or rear storage volume of a micromobility vehicle may include one or more retainers that secure an object to the vehicle within the storage volume. In some embodiments, the retainer may include an elastic member (e.g., elastic band, elastic strap, etc.) having two ends and an intermediate portion disposed inside of a housing. The housing may include two or more pins around which the intermediate portion of the elastic member travels in a serpentine (e.g., a winding) path, where portions of the elastic member double back or otherwise change directions one or more times to form the path. In one embodiment, the elastic member may double back on itself at least twice within the housing. The ends of the elastic member may be secured to the vehicle such that when an object is placed between the housing and/or the elastic member, the housing and/or elastic member may apply a force to the object to secure the object against the rigid portion of the vehicle to which the elastic member is attached (e.g., a footboard, frame, etc.). The elastic member may be expanded to accommodate objects or various sizes and shapes while still applying force to the object to secure it to the vehicle. Without wishing to be bound by theory, the serpentine pattern of the elastic member within the housing allows the retainer to expand to accommodate larger objects, while retracting into the housing when the retainer is not in use (e.g., no personal item is placed on the hook) to improve weatherization and durability of the elastic member.

FIGS. 1A-E illustrate a side view, a front view, a rear view, a top view, and a bottom view, respectively, of an electric vehicle 100 in accordance with some embodiments. In the illustrated embodiment, electric vehicle 100 is a two-wheeled vehicle with a front wheel 122A and a rear wheel 122B mounted on axles supported by fork 128A or 128B, respectively. Either or both of wheels 122A and 122B may be driven by an electric motor, which may have a stator mounted to one of the forks and a rotor coupled to the axle.

Batteries and control electronics may be mounted on board electric vehicle 100. In some embodiments, batteries and associated controllers may be mounted within a compartment coupled to a frame 101 of electric vehicle 100. For example, electric vehicle 100 includes a footboard 110. Footboard 110 may have upper and lower surfaces that are separated to create a compartment in which a battery and motor controller may be installed. The compartment may have one or more security features. For example, batteries may be removable, but may be locked in the compartment unless released by a key or special tool. Footboard 110 may have a bottom (e.g., flat) portion 111 arranged between the front wheel 122A and the rear wheel 122B and an angled portion 126. In some embodiments, the bottom portion 111 may be horizontal (e.g., parallel to a ground surface). However, in other embodiments, the bottom portion 111 may be inclined relative to a ground surface. For example, the bottom portion may be inclined relative to a ground surface if the front wheel 122A and rear wheel 122B are different sizes. The angled portion 126 may be configured to accommodate storage and operate, at least in part, as a fender for the front wheel 122A so that a separate fender (e.g., fender 120 shown covering a portion of the rear wheel 122B) may not be required for the front wheel 122A.

Electric vehicle 100 includes a column 112 coupled to the angled portion 126 of the footboard 110 and a stem 114 rotatably coupled to the column 112. Stem 114 may have handlebars 130 at one end and may be attached at the other end to front fork 128A such that rotation of the handlebars 130 turns the fork 128A and front wheel 122A with it. Column 112 may include a channel to allow cabling (e.g., for brakes, a throttle, electronics, etc.) to be placed internal to the column.

Electric vehicle 100 also includes seat 118, which is coupled to footboard 110 by seat posts 116A and 116B. In some embodiments, footboard 110, column 112, and seat posts 116A and 116B may form a continuous frame 101 that is not adjustable. For example, the frame may be formed of one continuous piece of material and/or may include multiple pieces of material that are welded, bolted or otherwise rigidly attached to prevent adjustment of the pieces relative to each other.

In some embodiments, the frame members may be tubular, with varying cross section. The cross section of the various frame members may be established based on functional as well as aesthetic considerations. For example, a portion of the frame adjacent to the angled portion 126 of the footboard may have a cross section that is elongated in a direction perpendicular to a surface on which wheels 122A, 122B rest. Such a configuration may provide a rim around portions of the footboard, creating a space along the angled portion 126 of the footboard for storage of items, and providing a finished and aesthetically pleasing appearance for electric vehicle 100, without separate body panels. Further, the rim may provide visual clues to riders how electric vehicle 100 can be used even when the rider needs to transport parcels, making the vehicle approachable.

Other features alternatively or additionally may be included on electric vehicle 100 to make the vehicle desirable for use on moderate distance trips. In some embodiments, column 112 may include a hook 124 configured to enable a loop, strap, or other portion of a personal item (e.g., a bag, backpack, package) to be secured to the vehicle. Collectively, the hook 124 and the angled portion 126 of the footboard may provide a storage area on the vehicle. Hook 124 may be adjustable such that it forms an angle relative to column 112 only when in use (e.g., when a bag is attached thereto) and retracts into column 112 when not in use.

As a further example of features that make electric vehicle 100 desirable for use on moderate distance trips, multiple user interface elements may be mounted to the upper end of stem 114, facing a user riding the vehicle. In the illustrated embodiment, stem 114 has attached thereto handlebars 130 configured to steer the vehicle when in use by rotating the stem 114 relative to the column 112. Brake levers 132A and 132B are arranged proximate to handlebars 130 and are coupled to braking components located near the wheels 122A and/or 122B by brake cables located, for example, within column 112. Handlebars 130 also include throttle 136A and 136B configured to provide acceleration to the electric vehicle when engaged, for example, by rotating the throttle around an axis along the length of the handlebars 130. Although throttle 136A and 136B is shown as a rotatable component, in some embodiments, throttle 136A and 136B may additionally or alternatively include components that allow for control of the throttle without requiring rotation. For example, throttle 136A and/or 136B may include one or more thumb-based controls that enable manipulation of the throttle without requiring rotation. Additionally, throttle 136A and 136B may be arranged on both right and left handlebars 130 as shown, or alternatively, the throttle may be arranged on only one side of the handlebars 130 (e.g., only throttle 136A arranged on the right side handlebar may be present without a corresponding throttle 136B on the left side handlebar).

In some embodiments, handlebars 130 also include electronic device holder 134 configured to grasp a portable electronic device, such as a smartphone. In some embodiments, electronic device holder 134 comprises spring-loaded arms that retract, at least in part, into the handlebars 130 such that, when a portable electronic device is arranged between the spring-loaded arms, the electronic device holder 134 grips the device using forces (e.g., spring-based forces) applied by the spring-loaded arms against the edges of the device in the holder. While the electronic device holder 134 shown in FIGS. 1A-E are configured as horizontally positioned arms, in other embodiments they may be vertically oriented. In some embodiments, the orientation of electronic device holder 134 may be configurable, for example, by rotating the electronic device holder. A smartphone may thus be held such that its display is visible to the user of the electric vehicle 100 or such that sound output by its speakers is audible to the user.

A smartphone or other mobile device may be wirelessly coupled to control electronics of the electric vehicle 100, either through short range wireless communication (e.g., near field communication, Bluetooth, etc.) with control electronics on the vehicle or through connection over a wide area network to a server exchanging information with control electronics on the vehicle. With such wireless coupling, the smartphone may provide a robust interface through which the user may provide or receive commands or information about the state of a vehicle during a trip. Further, the smartphone may have access to a cellular data network, GPS sensors and other sources of information, which can enable the user interface to display navigation or other information other than about the vehicle state per se that might be useful for a user. Such interfaces may be controlled by an app on the smartphone, enabling robust interfaces, which may be intuitive for a user to access and configure and/or can be provided along with guidance on configuring and accessing those user interfaces. In embodiments in which the electric vehicle is part of a vehicle sharing system in which vehicles are rented by users via a smartphone app, the app through which a user arranges for rental of a specific vehicle may control display of user interfaces associated with that vehicle, further making the vehicle accessible to users.

In some embodiments, a top surface of the stem 114 includes a display 144 arranged between the spring-loaded arms of the electronic device holder 134. The display 144 may be configured to display information about the electric vehicle. For example, display 144 may be configured to show a battery charge state of the vehicle, a predicted remaining range of the vehicle, maintenance information (e.g., tire pressure) related to the vehicle, a length of time that the vehicle has been operated, current charges associated with the operation of the vehicle when the vehicle is a shared vehicle, or any other suitable information. Display 144 may also be configured to show other information unrelated to the vehicle, but that the user may find useful during operation of the vehicle, such as time information and map or navigation information. When a portable electronic device (e.g., a smartphone) is secured by electronic device holder 134, display 144 may not be visible to the user due to the relative arrangement of electronic device secured by the electronic device holder 134 and the display 144. In such an instance, the display of the electronic device may present the same, different, or additional information that the display 144 is configured to present. In some embodiments, the display of the electronic device may be configured to present, e.g., via an app on the device, additional information to provide an enhanced user experience during operation of the vehicle. Additionally, the display 144 may be turned off or dimmed when an electronic device is secured in electronic device holder 134 to save power.

Electric vehicle 100 further includes lights 140 and 142 arranged on the front and rear of the vehicle. Front light 140 may be configured, at least in part, as a headlight for providing illumination of the roadway and to signal the presence of the vehicle to oncoming vehicular and non-vehicular traffic. Rear light 142 may be configured, at least in part, as a brake light to indicate to others behind the vehicle when the user of the vehicle has applied the brakes. Rear light 142 may also include one or more indicators for turn signals when the electric vehicle is configured to use turn signal indicators. In some embodiments, lights 140 and 142 are configured to display information about the vehicle, for example, when the user approaches the vehicle and/or starts the vehicle. For example, one or both of the lights may turn on and/or flash in a predetermined sequence upon starting the vehicle. Additionally, although shown as single lights 140 and 142 located on the front and rear of the vehicle respectively, it should be appreciated that each light assembly may include multiple lights having different characteristics (e.g., colors) and may be controlled independently or together.

Figure 2:
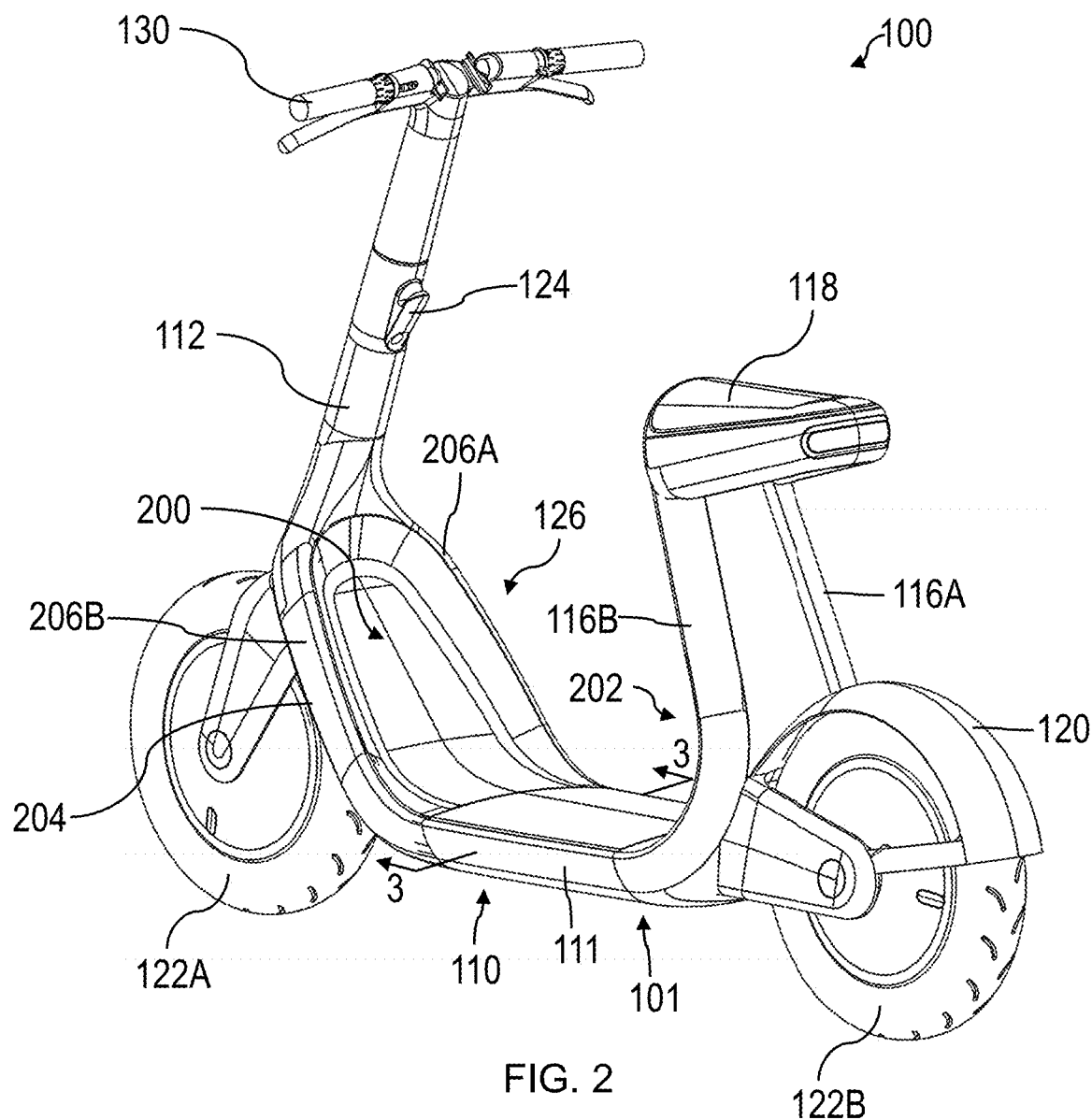
FIG. 2 illustrates a rear perspective view of the electric vehicle of FIG. 1A.

FIG. 2 illustrates a rear perspective view of the electric vehicle 100 of FIG. 1A showing a front storage volume 200. As shown in FIG. 2 and noted previously, the vehicle includes a footboard 110 having a bottom portion 111 that extends between a front wheel 122A and a rear wheel 122B. The vehicle also includes an angled frame portion 204 which extends from the bottom portion of the footboard substantially parallel to an angled footboard portion 126. The angled footboard portion 126 is disposed below a top edge of the angled frame portion 204, such that the angled footboard portion 126 is recessed relative to the angled frame portion 204. Alternatively, the angled frame portion 204 may be conceptualized as forming a rim around the angled footboard portion 126, as shown. In particular, a right frame portion 206A and a left frame portion 206B provide a raised rim or lip on the edges of the angled footboard portion 126 to help secure an object within the front storage volume 200 (e.g., to prevent sliding of the object laterally off the angled portion of the footboard 126. Both the angled footboard portion 126 and the angled frame portion 204 extend forward and upward relative to the bottom portion 111 of the footboard 110. A column 112 extends upwards and rearwards from the angled frame portion 204 away from the front wheel 122A toward the handlebars 130. According to the embodiment of FIG. 2, the front storage volume is defined on two sides by the angled footboard portion 126 and the column 112.

According to the embodiment of FIG. 2, the vehicle 100 includes a front hook 124 which is disposed on the column 112 and is configured to receive and support a strap of an object placed in the front storage volume 200. For example, the hook 124 may receive a fabric strap of a tote bag or shoulder bag. As another example, the hook 124 may receive a plastic or paper strap of a shopping bag. The hook may alternatively receive and retain any suitable portion of an object in the front storage volume. In some embodiments, the hook may be biased to retract into the column 112 when not in use. For example, a torsion spring may urge the hook into a recess formed in the column when an object is not retained by the hook. Additionally, while the hook 124 of FIG. 2 is shown having a semi-circular shape, in the embodiment of FIG. 2, any suitable shape for the hook may alternatively be employed.

As shown in FIG. 2, the vehicle 100 also includes a rear storage volume 202 disposed at a rearmost portion of the footboard 110. The rear storage volume of the vehicle is discussed in further detail below with reference to FIGS. 4-5.

According to the embodiment of FIG. 2, the front storage volume 200 is shaped approximately as a triangular prism. The angled footboard portion 126 forms a first side of the triangular prism, while the column forms a second side of the triangular prism. The right angled frame portion 206A and the left angled frame portion 206B define third and fourth parallel sides of the triangular prism. A plane extending from the top of the column 112 to an intersection between the angled footboard portion 126 and the footboard 110 may define a fifth side of the triangular prism to complete the shape. Of course, other shapes for the front storage volume may be employed. Exemplary geometries of a front storage volume 200 and a rear storage volume 202 are discussed in further detail below with reference to FIGS. 6A-6B.

Figure 3:
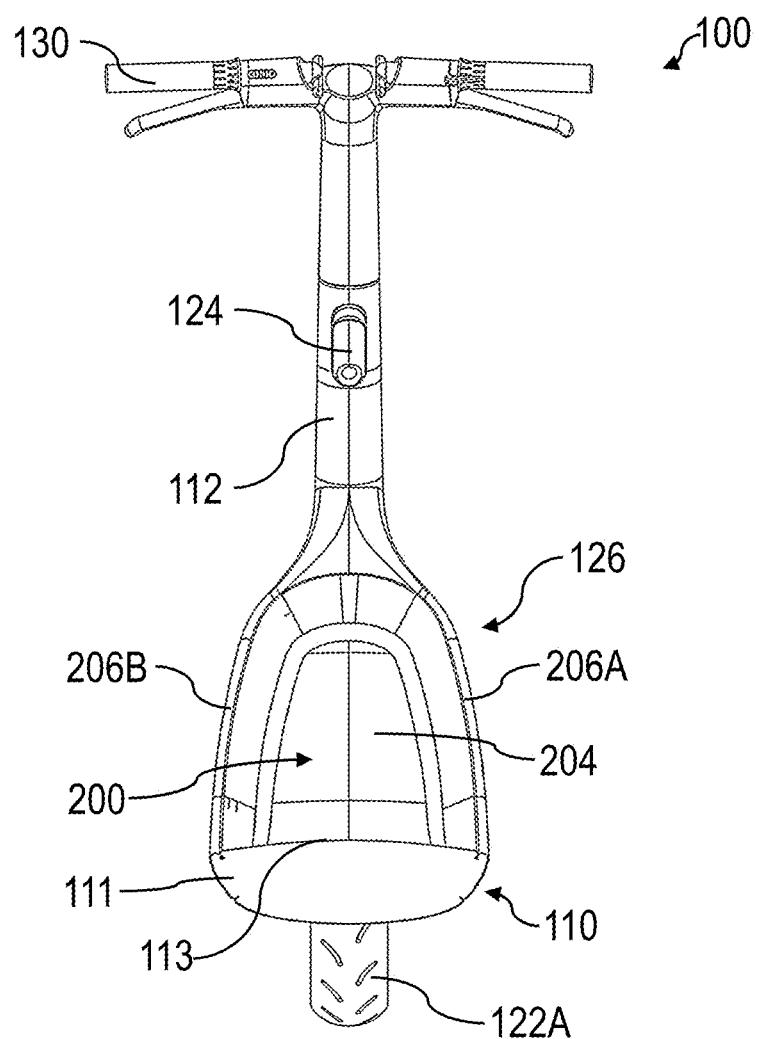
FIG. 3 illustrates a cross sectional view of the electric vehicle of FIG. 2 taken along line 3-3.

FIG. 3 illustrates a cross sectional view of the electric vehicle 100 taken along line 3-3 of FIG. 2. As shown in FIG. 3 and noted previously, the vehicle includes a footboard 110 having a bottom portion 111 and an angled footboard portion 126 extending upward and away from the bottom portion of the footboard 110. The footboard shown in FIG. 3 includes a curved uppermost surface 113. In other embodiments, the curved uppermost surface may be flat (e.g., horizontal to the ground), or have any other suitable surface profile. According to the embodiment of FIG. 3, the angled footboard portion 204 includes a right angled frame portion 206A and a left angled frame portion 206B, which are disposed at the sides of the angled footboard portion 126. The right and left angled frame portions 206A, 206B are arranged in an inverted U-shape around the angled footboard portion 126. Put another way, the left and right angled frame portions join together at the top of the angled footboard portion 126 to form the bottom of the column 112.

Figure 4:
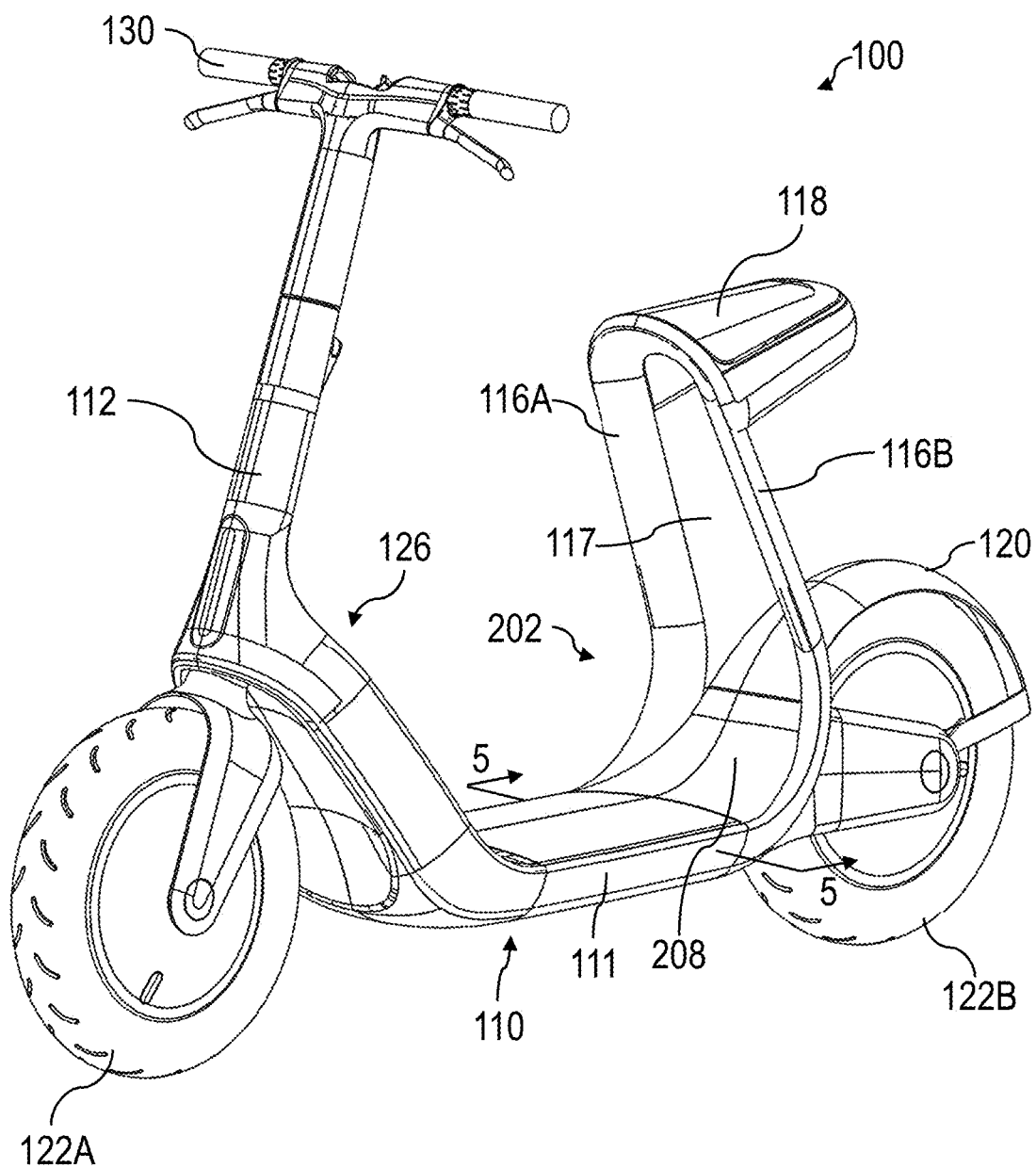
FIG. 4 illustrates a front perspective view of the electric vehicle of FIG. 1A.

FIG. 4 illustrates a front perspective view of the electric vehicle 100 of FIG. 1A, better showing the rear storage volume 202. According to the embodiment of FIG. 4, the vehicle 100 includes a curved footboard portion 208 which extends upwards and rearwards from the footboard 110. The curved footboard portion curves around the rear wheel 122B and transitions to fender 120. On both sides of the curved footboard portion are portions of the frame 101. In particular, a right seat post 116A and a left seat post 116B forming part of the frame are disposed on each side of the curved footboard portion 208. Similarly to the angled footboard portion, the curved footboard portion is recessed relative to the frame as the curved footboard portion is disposed below a top edge of the seat posts 116A, 116B. The seat posts may support the sides of an object placed in the rear storage volume (e.g., by inhibiting lateral movement of an object positioned in the rear storage volume). The seat posts curve upwards and forwards of the curved footboard portion. Accordingly, in the embodiment of FIG. 4, the rear storage volume is defined at least partially by the curved footboard portion 208 and the seat posts 116A, 116B. In the embodiment shown in FIG. 4, a gap or open space 117 exists between the seat posts 116A, 116B.

Figure 5:
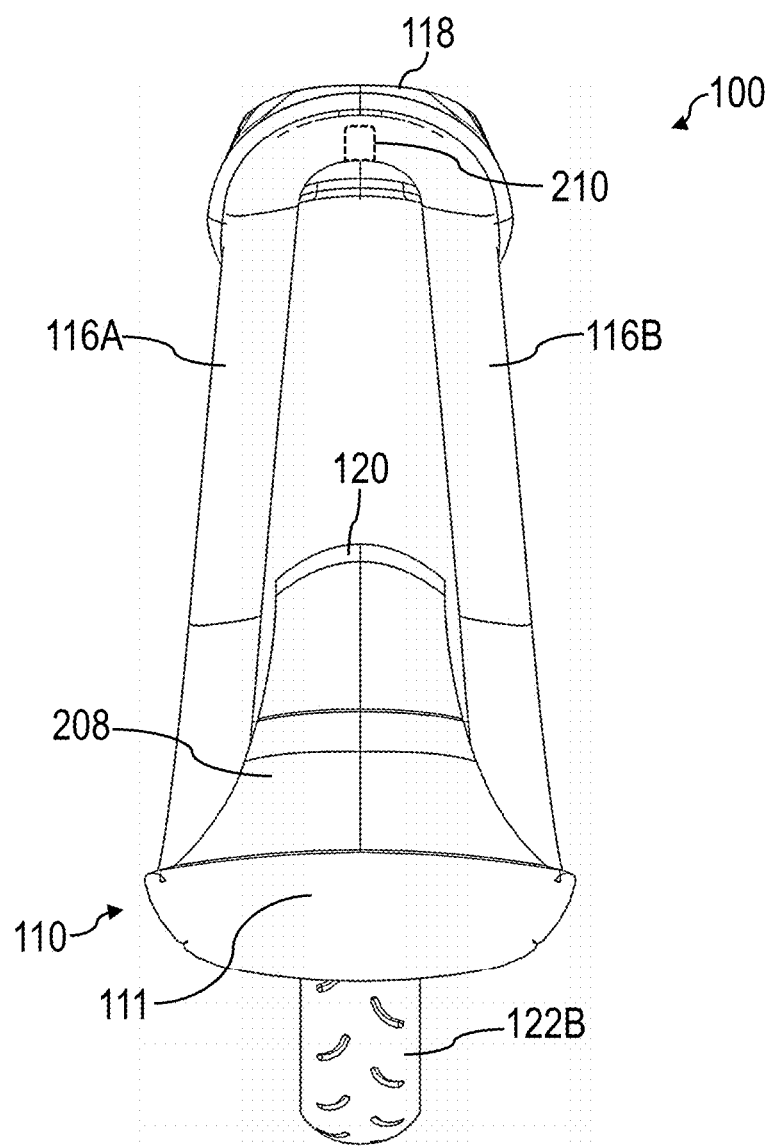
FIG. 5 illustrates a cross sectional view of the electric vehicle of FIG. 4 taken along line 5-5.

FIG. 5 illustrates a cross sectional view of the electric vehicle 100 taken along line 5-5 of FIG. 4. As shown in FIG.

5, the curved footboard portion 208 extends upwards from the bottom portion 111 of the footboard 110. The seat posts 116A, 116B extend upwards from the curved footboard portion 208 and include a gap between them. The seat posts 116A, 116B, terminate into a seat 118 and support the seat. According to the embodiment of FIG. 5, the seat posts 116A, 116B are joined together and form an inverted U-shape, with the curve of the U supporting the seat 118.

In some embodiments, as shown in FIG. 5, the vehicle may include a rear hook 210 which is disposed on at least one of the seat posts 116A, 116B. The rear hook 210 may be similar to that shown and discussed with reference to FIGS. 1A and 3. The rear hook may be configured to enable a loop or strap of a personal item (e.g., a bag, backpack, package, shopping bag, etc.) to be secured in the rear storage volume 202. Like the front hook 124, the rear hook 210 may be adjustable such that it forms an angle relative to the seat posts 116A, 116B only when in use (e.g., when a bag is attached thereto), and retracts into the seat post(s) when not in use. In some embodiments, one or more rear hooks may be disposed on the seat 118 or another portion of the vehicle located in the rear storage volume to further facilitate securing an object in the rear storage volume 202.

Figure 6A:
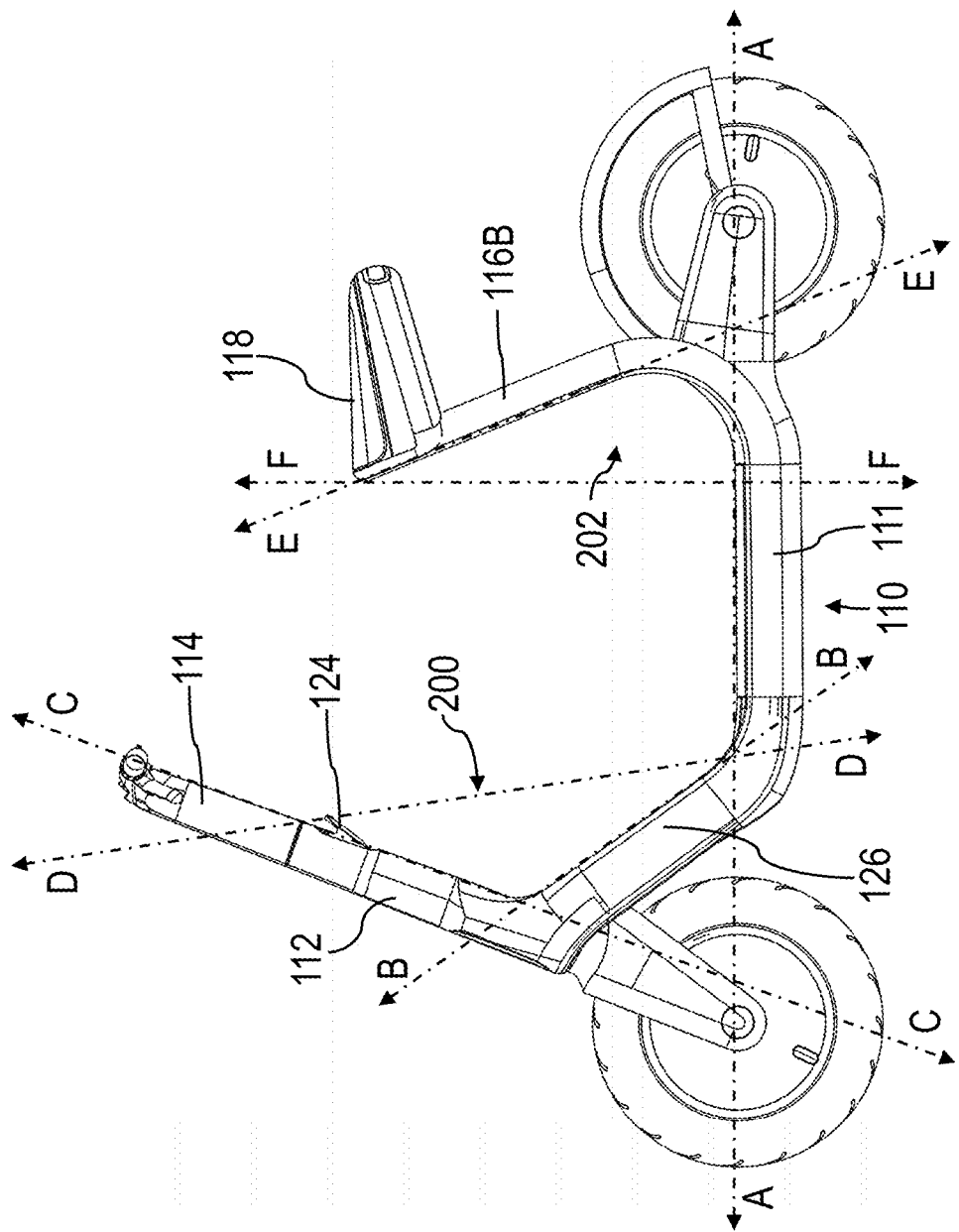
FIG. 6A illustrates a left side view of the electric vehicle of FIG. 1A in a first configuration.

FIG. 6A illustrates a left side view of the electric vehicle 100 of FIG. 1A in a first configuration showing the shapes of the front storage volume 200 and rear storage volume 202. As shown in FIG. 6A, the bottom portion 111 of the footboard 110 defines a first plane along line A-A. The angled frame portion 204 which extends upwards and forwards from the bottom portion 111 of the footboard 110 to the column 112 at an acute angle relative to footboard, as well as an angled footboard portion which extends in a parallel direction define a second plane along line B-B. The second plane is acutely inclined relative to the footboard plane A-A. The column 112 of the frame, which extends upwards and rearwards from the angled frame portion 204 to the handlebars 130 at an acute angle relative to the footboard 110, defines a third plane along line C-C which is inclined relative to both the first plane A-A and the second plane B-B. A fourth plane along line D-D intersects the third plane C-C at an uppermost portion of the column 112 below the stem 114, and also intersects the second plane B-B at a location where the angled frame portion 204 meets the bottom portion 111 of the footboard 110. Put another way, the first plane A-A, second plane B-B, and fourth plane D-D all intersect along the same line. As shown in FIG. 6A, the front storage volume 200 may be bounded on three sides by the second plane B-B, third plane C-C, and fourth plane D-D. Accordingly, when viewed from the side, the front storage volume may be approximately shaped as a triangle. Of course, the fourth plane D-D can extend from any point along the column 112 or stem 114 to the intersection between the angled frame portion 204 and bottom portion 111 of the footboard 110. In some embodiments, the hook 124 may be position at the point where the fourth plane D-D intersects the column or stem.

As shown in FIG. 6A, the rear storage volume 202 may also be approximately shaped as a triangle when the vehicle 100 is viewed from the side. The seat posts (left seat post 116B is shown), define a fifth plane along line E-E. A sixth plane between an uppermost portion of the seat 118 and the intersection between the curved footboard portion 208 and the bottom portion 111 of the footboard 110 extends along line F-F. The triangular rear storage volume may be approximated by the first plane A-A on one side (corresponding to the footboard 110), the fifth plane E-E (corresponding to the seat post 116B) on a second side, and the sixth plane F-F on a third side. According to one embodiment as shown in FIG. 6A, the rear storage volume maybe shaped approximately as a right triangle, with the sixth plane F-F being perpendicular to the first plane A-A.

Figure 6B:
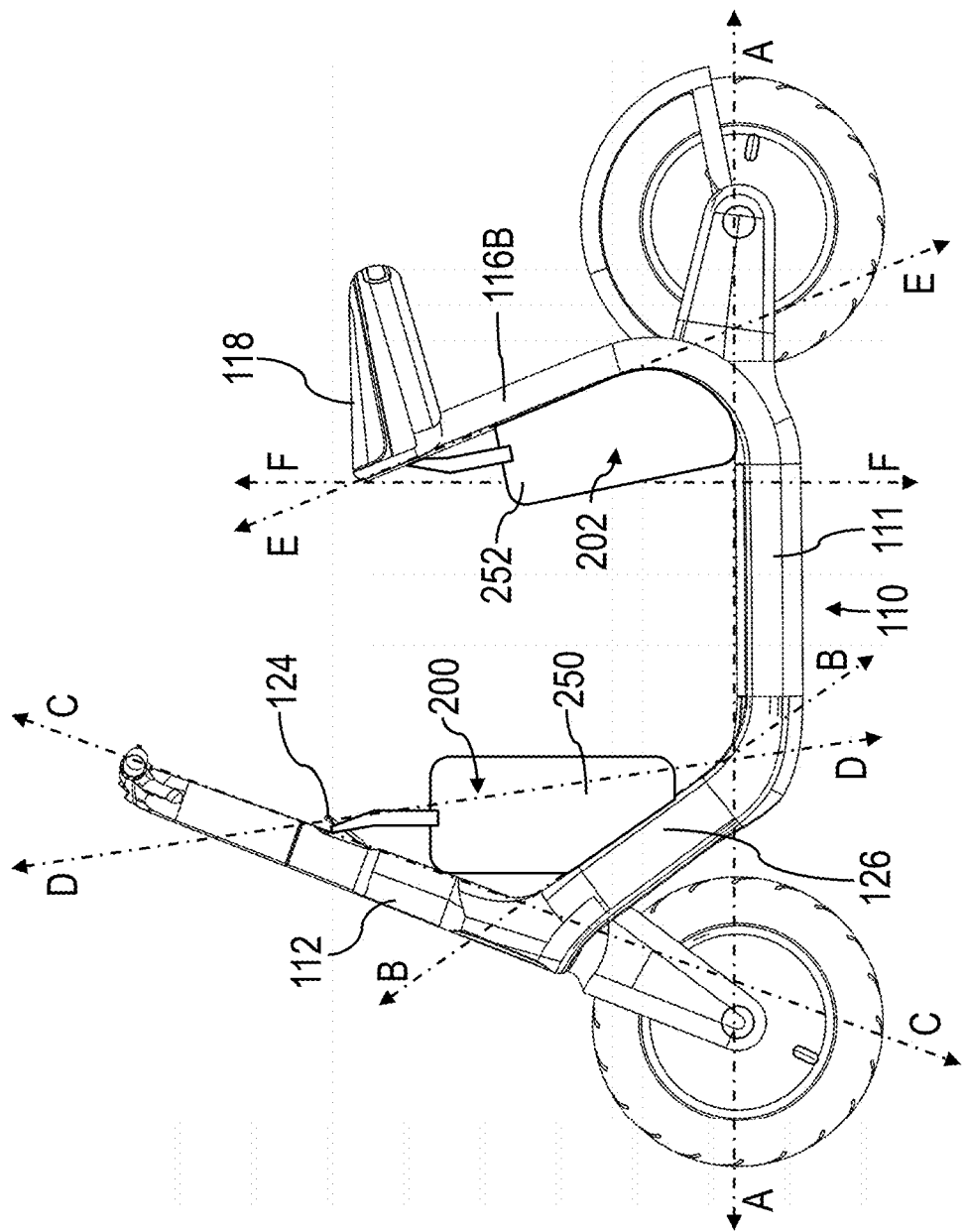
FIG. 6B illustrates the electric vehicle of FIG. 6A in a second configuration.

FIG. 6B illustrates the electric vehicle of FIG. 6A in a second configuration with objects stored in the front storage volume 200 and rear storage volume 202. In particular, the front storage volume 200 holds a first tote bag 250, and the rear storage volume holds a second tote bag 252. Each of the first and second tote bags fit approximately within the storage volumes bounded by the planes as discussed with reference to FIG. 6A. A strap of the first tote bag 250 is suspended from the front hook 124, which supports the first tote bag in an upright orientation within the front storage volume. The first tote bag 250 may rest against the angled portion 126 of the footboard which is recessed below the angled frame portion 204. The angled frame portion forming a rim or lip above the angled footboard portion may serve to help secure the first tote bag in the configuration shown in FIG. 6B and inhibit the tote bag from swinging laterally while the vehicle is in motion (e.g., especially during turning). The second tote bag 252 may rest against bottom portion 111 of the footboard 110 and seat post 116B. As shown in FIG. 6B, the second tote bag may also be suspended from a hook disposed on the seat post 116B, so that the second tote bag is maintained in an upright position in the rear storage volume 202. The second tote bag 252 may also rest against a recessed curved portion of the footboard, such that the seat posts help prevent the second tote bag from shifting while the vehicle 100 is being operated. Of course, while tote bags are shown in the configuration of FIG. 6B, any suitable object or personal item may be stored in the front and rear storage volumes, such as boxes, backpacks, handbags, shopping bags, messenger bags, etc.

Figure 7:
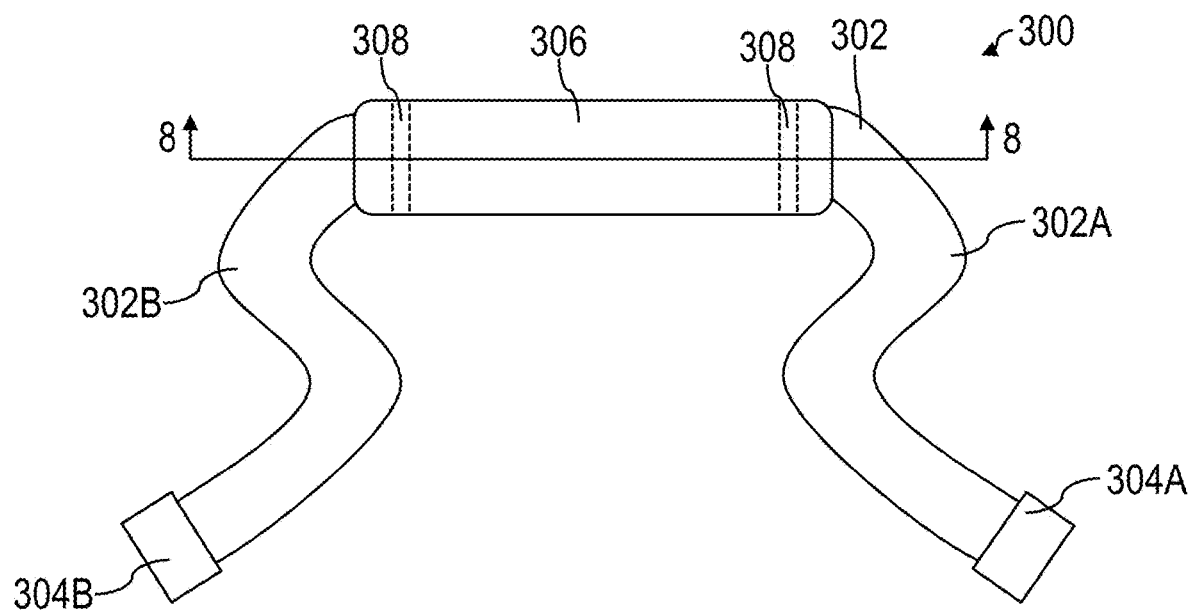
FIG. 7 illustrates a schematic of a retainer in accordance with some embodiments.

FIG. 7 illustrates a schematic of a retainer 300 that may be used to help secure cargo to a micromobility vehicle in accordance with some embodiments. As discussed above, in some instances it may be desirable to secure an object placed in a front or rear storage volume to a portion of a frame of a vehicle when, for example, the object does not include a portion that can be secured using a hook. This retainer may accommodate a large number of differently sized and shaped objects. According to the embodiment of FIG. 7, the retainer is configured to expand to accommodate objects of larger sizes, while retracting out of the way when not in use. The retainer 300 includes an elastic member 302 and a housing 306. The elastic member includes a first end 302A and a second end 302B, which are configured to be coupled to a first frame mount 304A and a second frame mount 304B on the frame of the vehicle, respectively. The first and second frame mounts. For example, as will be discussed in more detail below with regards to the embodiment of FIG. 9, the frame mounts may be secured to an angled frame portion (e.g., for securing an object in a front storage volume of the vehicle) or a seat post (e.g., for securing an object in a rear storage volume of the vehicle). The frame mounts may be secured to the frame of the vehicle using any appropriate connection, including, but not limited to, fasteners such as adhesives, screws, and rivets. The elastic member may retract and expand between the frame mounts to lengthen or shorten the amount of elastic member between the frame mounts. Accordingly, an object placed between the elastic member 302 and the frame mounts 304A, 304B (e.g., in a front or rear storage volume) may have a variety of shapes which is accommodated by the expansion of the elastic member 302. When the elastic member is not expanded by an object placed in the storage volume, the band may retract to a resting or initial configuration to stow the retainer out of the way in the front or rear storage volume of the vehicle.

According to the embodiment of FIG. 7, an intermediate portion of the elastic member 302 passes through an interior volume of the housing 306. The housing may be a rigid or semi-rigid cover for the elastic member, which may optionally protect the elastic member from direct contact with an object that would otherwise wear the elastic member. The housing may also function as a cover for a majority of the elastic member length when the elastic member is not in use and is retracted. As the housing does not change in length as the elastic member 302 retracts and expands, when the elastic member is fully retracted the housing 306 may cover and protect the elastic member. The housing may also distribute force from the elastic member across a large contact surface with an object secured by the elastic member within the storage volume. Additionally, the housing may function as a convenient handle by which the retainer can be grabbed by a user and expanded so that an object may be placed in a storage volume and secured with the retainer. According to the embodiment of FIG. 7, the internal volume of the housing 306 includes at least two pins 308 around which the intermediate portion of the elastic member traverses in a serpentine path, as will be discussed further with reference to FIG. 8. The serpentine arrangement of the elastic member in the housing 306 allows the retainer to expand to much greater lengths than if the elastic member was straight, while allowing the elastic member to retract to a short overall length when not in use so that the retainer may be stowed out of the way when not in use.

Figure 8:
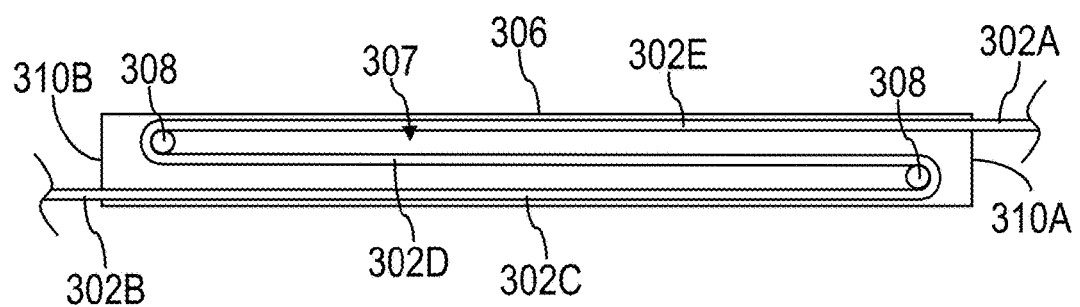
FIG. 8 illustrates a cross sectional view of the retainer of FIG. 7 taken along line 8-8.

FIG. 8 illustrates a cross sectional view of the retainer 300 of FIG. 7 taken along line 8-8 showing the internal volume 307 of the housing 306. As shown in FIG. 8, the housing 306 includes two pins 308 which span the internal volume. Put another way, the pins cross the internal volume 307 in a direction transverse (e.g., perpendicular) to a longitudinal axis of the housing 306 and internal volume 307. The housing 306 includes a first opening 310A and a second opening 310B. The first end 302A of the elastic member enters the housing through the first opening 310A, while the second end 302B of the elastic member enters the housing through the second opening 310B. As shown in FIG. 8, an intermediate portion 302C, 302D, 302E of the elastic member is disposed in a serpentine pattern around the pins 308. Put another way, the intermediate portion of the elastic member wraps around the pins and doubles back on itself at least twice, to form a first layer 302C, a second layer 302D, and a third layer 302E of the elastic member inside of the internal volume 307. Put another way, the elastic member is routed through the first opening 310A, around the pin 308 near the second opening 310B, back toward the first opening, around the pin near the first opening, and then through the second opening. The pins 308 are rigidly secured in the housing, so that when the elastic member is stretched the band is kept in the serpentine pattern shown in FIG. 8.

The serpentine path of the elastic member within the retainer increases the total expandable length of the retainer to be able to secure a wider range of objects to the micromobility electric vehicle. Each additional layer of elastic member in the intermediate portion further serves to increase the expandability of the retainer. As the doubled back portions of the elastic member are still disposed inside the housing 306, the overall length of the intermediate portion when the elastic member is fully retracted is no more than the length of the housing. Accordingly, the arrangement shown in FIG. 8 effectively increases the upper limit of expandability of the retainer, while maintaining the length of the retainer in the retracted configuration. In some embodiments, additional pins may be employed to create additional layers of elastic member which double back on each other inside the housing if further expandability of the retainer is desirable. In some embodiments, the pins 308 may include pulleys or other rotatable elements, which allow the intermediate portion of the band to smoothly expand and retract with low friction inside of the housing.

Figure 9:
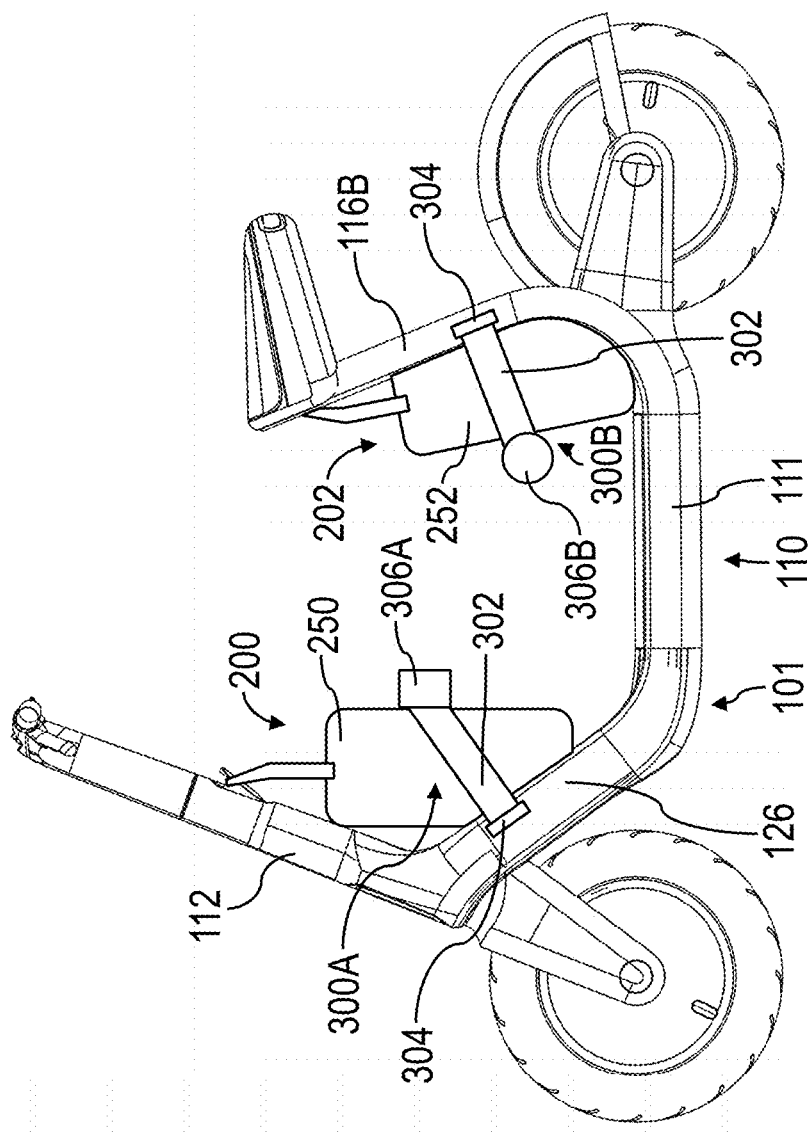
FIG. 9 illustrates a left side view of an electric vehicle and retainers in accordance with some embodiments.

FIG. 9 illustrates a left side view of an electric vehicle 100 and retainers 300A, 300B in accordance with some embodiments. As shown in FIG. 9, the retainers are secured to a frame 101 of the vehicle with frame mounts 304. In particular, a front storage retainer 300A is secured to an angled frame portion 204 with the frame mounts 304, while a rear storage retainer 300B is secured to a seat post 116B with the frame mounts 304. Accordingly, the two retainers 300A, 300B are secured to the frame in a location adjacent the front storage volume 200 and the rear storage volume 202, respectively. While the ends of the retainers shown in FIG. 9 are secured by frame mounts 304, in other embodiments, the retainers may be secured to the electric vehicle 100 in some other manner. For example, elastic members 302 may be looped around portions of the vehicle 100 to secure the retainers 300A, 300B to the vehicle. Additionally, the retainers may be attached to any portion of the vehicle where it may be desirable to secure objects, including, but not limited to, a footboard 110, an angled footboard portion (see FIG. 2 for example), a curved footboard portion (see FIG. 4 for example), and a column 112.

As shown in FIG. 9, a first tote bag 250 is disposed in the front storage volume 200, and a second tote bag 252 is disposed in the rear storage volume 202. The first tote bag 250 is secured in the front storage volume by the front storage retainer 300A, which includes a square housing 306A. An elastic member disposed through the housing 306A is expanded and biased toward an initial un-stretched configuration. Accordingly, the retainer applies a force to the first tote bag 250 in a direction toward the angled frame portion 204, thereby securing the first tote bag to the electric vehicle 100 within the front storage volume 200. The rear storage retainer 300B secures the second tote bag 252 to the electric vehicle 100 within the rear storage volume 202. An expanded elastic member 302 is biased toward an initial, un-stretched position and applies a force on the second tote bag toward the seat post 116B via a round housing 306B. The differently shaped housings 306A, 306B may be suited to secure differently-shaped objects to the electric vehicle. For example, the square or rectangular housing 306A may be well suited to secure flat sided objects such as boxes, while the round housing 306B may be well suited to secure flexible or irregularly shaped objects such as tote bags. Of course, other suitable housing shapes may be employed.

While retainers including an elastic member according to some embodiments are shown in FIGS. 7-9, other retainers may be employed to secure an object in a front or rear storage volume. In some embodiments, a cargo net may span a rear storage volume or a front storage volume. The cargo net may include an elastic or semi-elastic mesh that may attach to at least three points on a frame of an electric vehicle. For example, in one embodiment, a cargo net mesh may attach to a frame of the electric vehicle at four points on the frame. In some embodiments, a retainer may include a strap coupled to a reel which allows the strap to be wound or unwound from the reel. The reel may include a torsion spring or other biasing element which biases the strap toward a wound state on the reel. The reel may be coupled to one side of a storage volume on a frame of an electric vehicle, and the strap may be selectively unwound and secured to an opposite side (e.g., with a pin, hook, buckle, etc.) such that the strap spans the storage volume and may secure an object therein. In some embodiments, an extension limited elastic member may span a storage volume to secure an object in the storage volume. The extension limited elastic member may include an elastic band surrounded by a non-elastic sheath (e.g., fabric, plastic, metal) which limits the extendibility of the elastic member.

It should be noted that while retainers of exemplary embodiments described herein are employed with front and rear storage volumes of an electric vehicle, the retainers may be employed with any suitable storage volume, including, but not limited to, baskets, trunks, panniers, and cargo racks.

Figure 10:
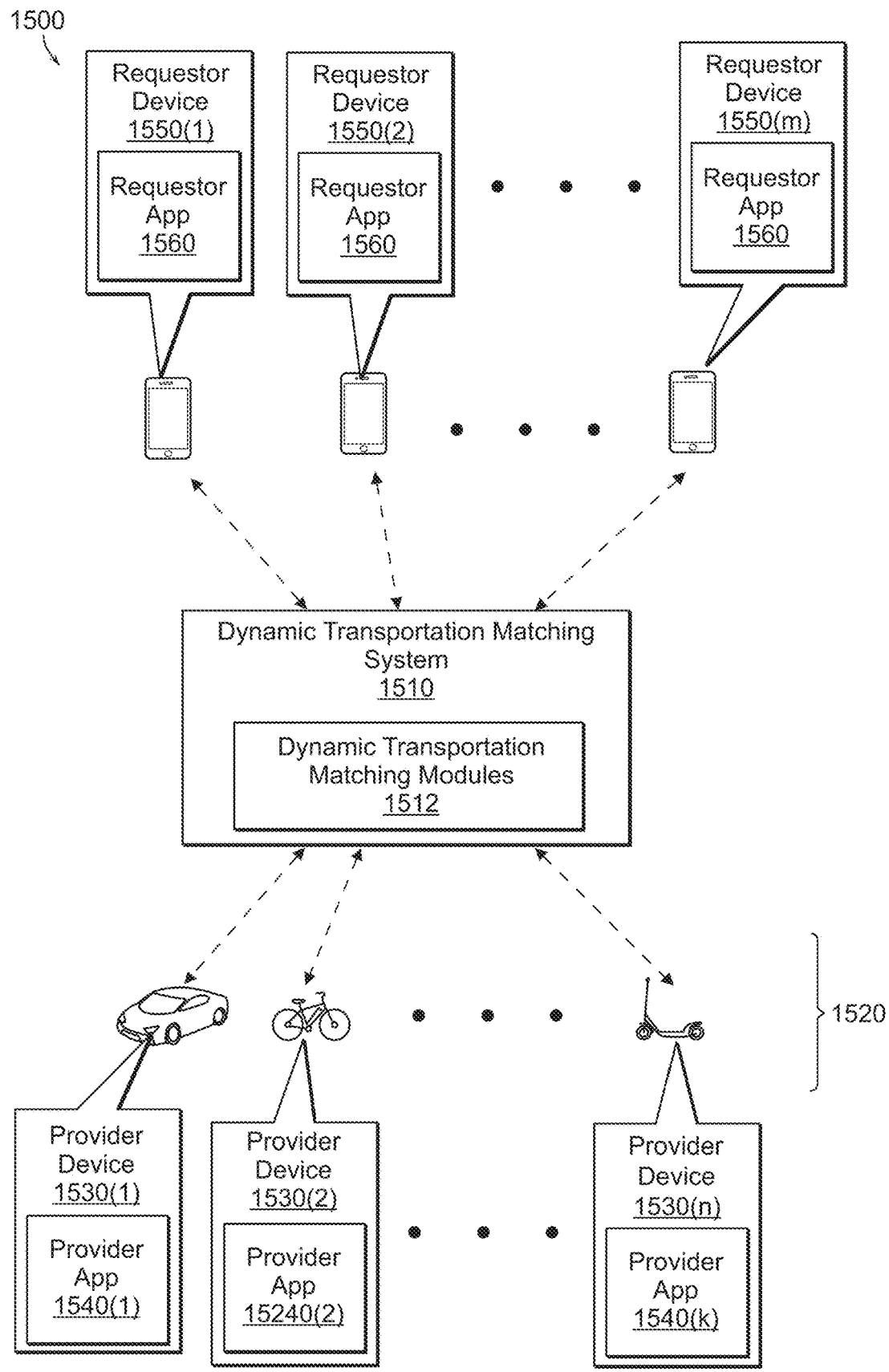
FIG. 10 illustrates an example system for matching transportation requests with a dynamic transportation network that includes personal mobility vehicles.

A micromobility vehicle as described herein may be made available through an on-demand, multimodal transportation system. FIG. 10 illustrates an example system 1500 for matching transportation requests with a dynamic transportation network that includes personal mobility vehicles. As shown in FIG. 10 a dynamic transportation matching system 1510 may be configured with one or more dynamic transportation matching modules 1512 that may perform one or more of the steps described herein. Dynamic transportation matching system 1510 may represent any computing system and/or set of computing systems capable of matching transportation requests. Dynamic transportation matching system 1510 may be in communication with computing devices in each of a group of vehicles 1520. Vehicles 1520 may represent any vehicles that may fulfill transportation requests. In some examples, vehicles 1520 may include disparate vehicle types and/or models. For example, vehicles 1520 may include road-going vehicles and personal mobility vehicles. In some examples, some of vehicles 1520 may be standard commercially available vehicles. According to some examples, some of vehicles 1520 may be owned by separate individuals (e.g., transportation providers). Furthermore, while, in some examples, many or all of vehicles 1520 may be human-operated, in some examples many of vehicles 1520 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requester, and/or an autonomous system for piloting a vehicle. While FIG. 10 does not specify the number of vehicles 1520, it may be readily appreciated that the systems described herein are applicable to hundreds of vehicles, thousands of vehicles, or more. In one example, dynamic transportation matching system 1510 may coordinate transportation matchings within a single region for 50,000 vehicles or more on a given day. In some examples, vehicles 1520 may collectively form a dynamic transportation network that may provide transportation supply on an on-demand basis to transportation requestors.

Dynamic transportation matching system 1510 may communicate with computing devices in each of vehicles 1520. The computing devices may be any suitable type of computing device. In some examples, one or more of the computing devices may be integrated into the respective vehicles 1520. In some examples, one or more of the computing devices may be mobile devices. For example, one or more of the computing devices may be smartphones. Additionally, or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requester and/or provider for a transportation matching application, a navigation application, and/or any other application suited for the use of requesters and/or providers). Additionally, or alternatively, one or more of the computing devices may be devices suitable for installing in a vehicle and/or may be a vehicle's computer that has a transportation management system application installed on the computer in order to provide transportation services to transportation requesters and/or communicate with dynamic transportation matching system 1510.

As shown in FIG. 10, vehicles 1520 may include provider devices 1530(1)-(n) (e.g., whether integrated into the vehicle, permanently affixed to the vehicle, temporarily affixed to the vehicle, worn by a driver of the vehicle, etc.). In some examples, provider devices 1530(1)-(n) may include a respective provider app 1540(1)-(k). Provider apps 1540(1)-(k) may represent any application, program, and/or module that may provide one or more services related to operating a vehicle and/or providing transportation matching services. For example, provider apps 1540(1)-(k) may include a transportation matching application for providers and/or one or more applications for matching personal mobility vehicles (PMVs) with requester devices. In some embodiments, different types of provider vehicles may be provisioned with different types of provider devices and/or different provider applications. For example, PMVs may be provisioned with provider devices that are configured with a provider application that enables transportation requesters to reserve and/or operate the PMV while road-constrained vehicles (e.g., cars) may be provisioned with provider devices that are configured with a provider application that enables provider vehicle operators (e.g., transportation providers) to respond to requests from transportation requesters. In some examples, provider applications 1540(1)-(k) may match the user of provider apps 1540(1)-(k) (e.g., a transportation provider) with transportation requesters through communication with dynamic transportation matching system 1510. In addition, and as is described in greater detail below, provider apps 1540(1)-(k) may provide dynamic transportation matching system 1510 with information about a provider (including, e.g., the current location of the provider and/or vehicle) to enable dynamic transportation matching system 1510 to provide dynamic transportation matching and/or management services for the provider and one or more requesters. In some examples, provider apps 1540(1)-(k) may coordinate communications and/or a payment between a requester and a provider. According to some embodiments, provider apps 1540(1)-(k) may provide a map service, a navigation service, a traffic notification service, and/or a geolocation service.

Additionally, as shown in FIG. 10, dynamic transportation matching system 1510 may communicate with requester devices 1550(1)-(m). In some examples, requester devices 1550(1)-(m) may include a requester app 1560. Requester app 1560 may represent any application, program, and/or module that may provide one or more services related to requesting transportation matching services. For example, requester app 1560 may include a transportation matching application for requesters. In some examples, requester app 1560 may match the user of requester app 1560 (e.g., a transportation requester) with transportation providers through communication with dynamic transportation matching system 1510. In addition, and as is described in greater detail below, requester app 1560 may provide dynamic transportation matching system 1510 with information about a requester (including, e.g., the current location of the requester) to enable dynamic transportation matching system 1510 to provide dynamic transportation matching services for the requester and one or more providers. In some examples, requester app 1560 may coordinate communications and/or a payment between a requester and a provider. According to some embodiments, requester app 1560 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requesters with one or more transportation providers. For example, a transportation matching system may provide one or more transportation matching services for a networked transportation service, a ride sourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requesters to ride opportunities and/or that arranges for requesters and/or providers to meet), a mapping system, a navigation system (e.g., to help a provider reach a requester, to help a requester reach a provider, and/or to help a provider reach a destination), a reputation system (e.g., to rate and/or gauge the trustworthiness of a requester and/or a provider), a payment system, and/or an autonomous or semi-autonomous driving system. The transportation matching system may be implemented on various platforms, including a requester-owned mobile device, a computing system installed in a vehicle, a requester-owned mobile device, a server computer system, or any other hardware platform capable of providing transportation matching services to one or more requesters and/or providers.

Figure 11:
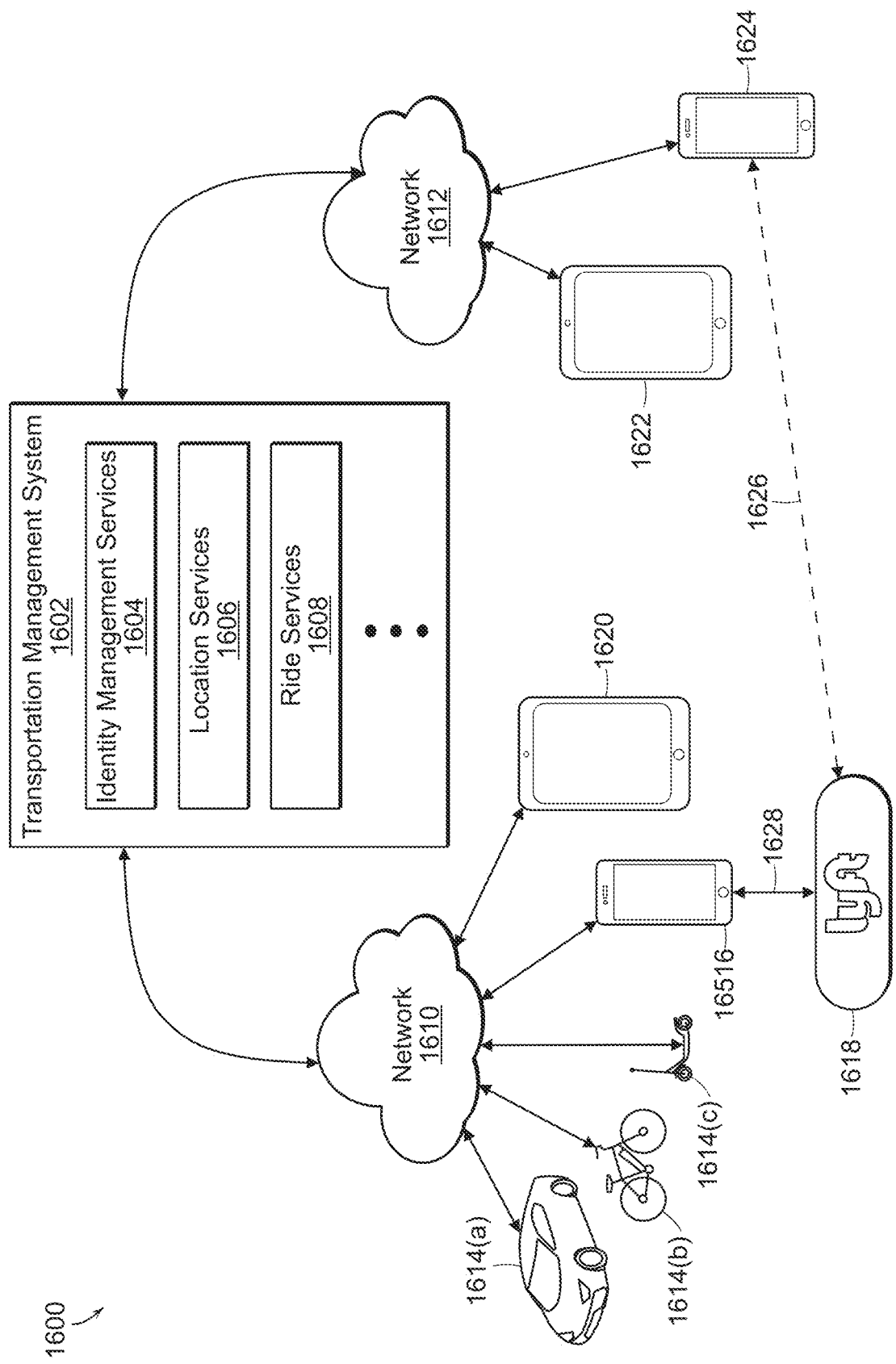
FIG. 11 shows a transportation management environment in accordance with some embodiments.

FIG. 11 shows a transportation management environment 1600, in accordance with various embodiments. As shown in FIG. 11, a transportation management system 1602 may run one or more services and/or software applications, including identity management services 1604, location services 1606, ride services 1608, and/or other services. Although FIG. 11 shows a certain number of services provided by transportation management system 1602, more or fewer services may be provided in various implementations. In addition, although FIG. 11 shows these services as being provided by transportation management system 1602, all or a portion of any of the services may be processed in a distributed fashion. For example, computations associated with a service task may be performed by a combination of transportation management system 1602 (including any number of servers, databases, etc.), one or more devices associated with a provider (e.g., devices integrated with managed vehicles 1614(*a*), 1614(*b*), and/or 1614(*c*); provider computing devices 1616 and tablets 1620; and transportation management vehicle devices 1618), and/or one or more devices associated with a ride requester (e.g., the requester's computing devices 1624 and tablets 1622). In some embodiments, transportation management system 1602 may include one or more general purpose computers, server computers, clustered computing systems, cloud-based computing systems, and/or any other computing systems or arrangements of computing systems. Transportation management system 1602 may be configured to run any or all of the services and/or software components described herein. In some embodiments, the transportation management system 1602 may include an appropriate operating system and/or various server applications, such as web servers capable of handling hypertext transport protocol (HTTP) requests, file transfer protocol (FTP) servers, database servers, etc.

In some embodiments, identity management services 1604 may be configured to perform authorization services for requesters and providers and/or manage their interactions and/or data with transportation management system 1602. This may include, e.g., authenticating the identity of providers and determining that they are authorized to provide services through transportation management system 1602. Similarly, requesters' identities may be authenticated to determine whether they are authorized to receive the requested services through transportation management system 1602. Identity management services 1604 may also manage and/or control access to provider and/or requester data maintained by transportation management system 1602, such as driving and/or ride histories, vehicle data, personal data, preferences, usage patterns as a ride provider and/or as a ride requester, profile pictures, linked third-party accounts (e.g., credentials for music and/or entertainment services, social-networking systems, calendar systems, task-management systems, etc.) and any other associated information. Transportation management system 1602 may also manage and/or control access to provider and/or requester data stored with and/or obtained from third-party systems. For example, a requester or provider may grant transportation management system 1602 access to a third-party email, calendar, or task management system (e.g., via the user's credentials). As another example, a requester or provider may grant, through a mobile device (e.g., 1616, 1620, 1622, or 1624), a transportation application associated with transportation management system 1602 access to data provided by other applications installed on the mobile device. In some examples, such data may be processed on the client and/or uploaded to transportation management system 1602 for processing.

In some embodiments, transportation management system 1602 may provide ride services 1608, which may include ride matching and/or management services to connect a requester to a provider. For example, after identity management services module 1604 has authenticated the identity a ride requester, ride services module 1608 may attempt to match the requester with one or more ride providers. In some embodiments, ride services module 1608 may identify an appropriate provider using location data obtained from location services module 1606. Ride services module 1608 may use the location data to identify providers who are geographically close to the requester (e.g., within a certain threshold distance or travel time) and/or who are otherwise a good match with the requester. Ride services module 1608 may implement matching algorithms that score providers based on, e.g., preferences of providers and requesters; vehicle features, amenities, condition, and/or status; providers' preferred general travel direction and/or route, range of travel, and/or availability; requesters' origination and destination locations, time constraints, and/or vehicle feature needs; and any other pertinent information for matching requesters with providers. In some embodiments, ride services module 1608 may use rule-based algorithms and/or machine-learning models for matching requesters and providers.

Transportation management system 1602 may communicatively connect to various devices through networks 1610 and/or 1612. Networks 1610 and 1612 may include any combination of interconnected networks configured to send and/or receive data communications using various communication protocols and transmission technologies. In some embodiments, networks 1610 and/or 1612 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1610 and/or 1612 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, Bluetooth 5, Near Field Communication (NFC), Z-Wave, and ZigBee). In various embodiments, networks 1610 and/or 1612 may include any combination of networks described herein or any other type of network capable of facilitating communication across networks 1610 and/or 1612.

In some embodiments, transportation management vehicle device 1618 may include a provider communication device configured to communicate with users, such as drivers, passengers, pedestrians, and/or other users. In some embodiments, transportation management vehicle device 1618 may communicate directly with transportation management system 1602 or through another provider computing device, such as provider computing device 1616. In some embodiments, a requester computing device (e.g., device 1624) may communicate via a connection 1626 directly with transportation management vehicle device 1618 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1602 over networks 1610 and 1612, in various embodiments, transportation management system 1602 may expose an interface, such as an application programming interface (API) or service provider interface (SPI) to enable various third parties which may serve as an intermediary between end users and transportation management system 1602.

In some embodiments, devices within a vehicle may be interconnected. For example, any combination of the following may be communicatively connected: vehicle 1614, provider computing device 1616, provider tablet 1620, transportation management vehicle device 1618, requester computing device 1624, requester tablet 1622, and any other device (e.g., smart watch, smart tags, etc.). For example, transportation management vehicle device 1618 may be communicatively connected to provider computing device 1616 and/or requester computing device 1624. Transportation management vehicle device 1318 may establish communicative connections, such as connections 1626 and 1628, to those devices via any suitable communication technology, including, e.g., WLAN technologies implementing the IEEE 902.12 family of standards, Bluetooth, Bluetooth Low Energy, Bluetooth 5, NFC, Z-Wave, ZigBee, and any other suitable short-range wireless communication technology.

In some embodiments, users may utilize and interface with one or more services provided by the transportation management system 1602 using applications executing on their respective computing devices (e.g., 1616, 1618, 1620, and/or a computing device integrated within vehicle 1614), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1614 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requester, including an application associated with transportation management system 1602. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
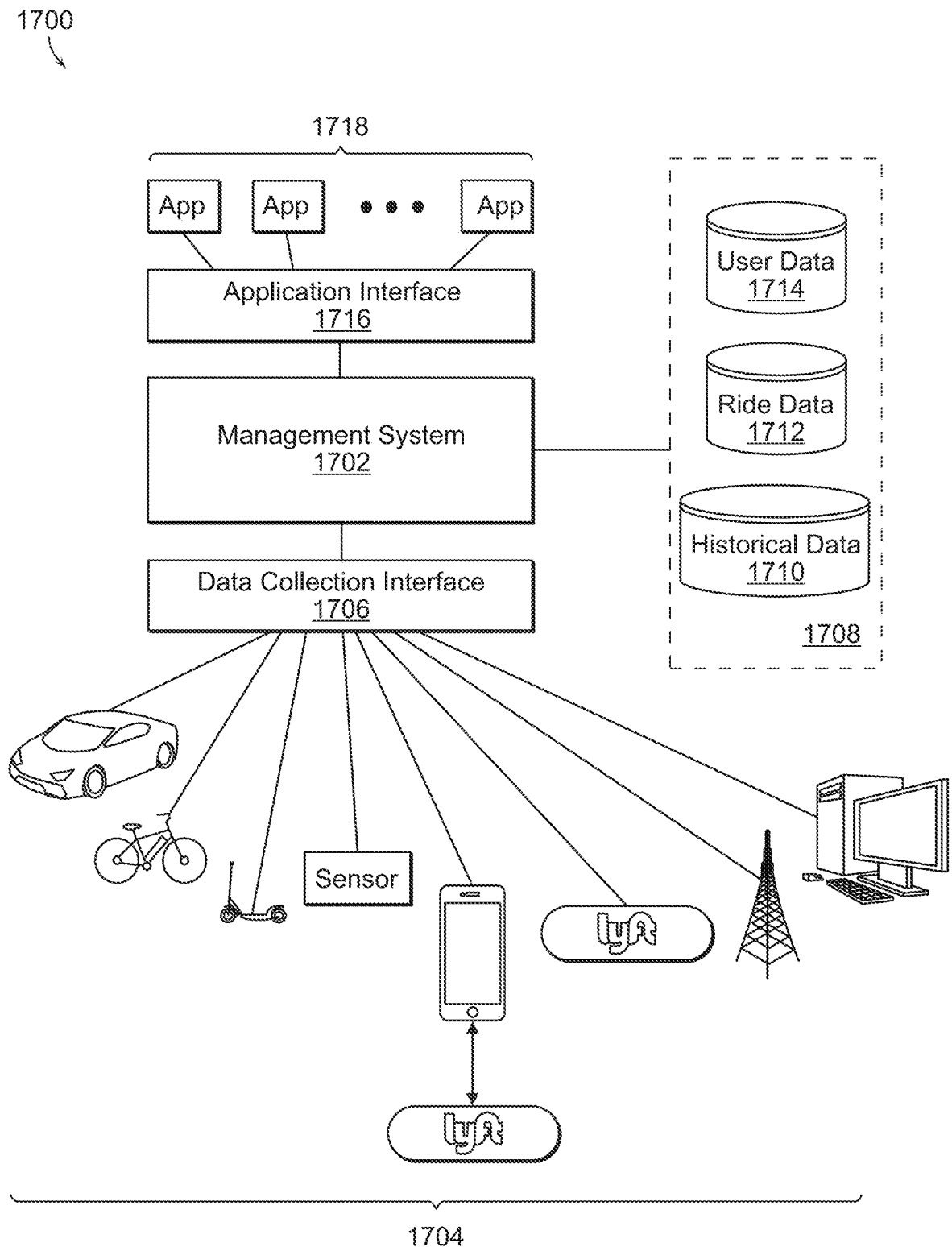
FIG. 12 shows a data collection and application management environment in accordance with some embodiments.

FIG. 12 shows a data collection and application management environment 1700, in accordance with various embodiments. As shown in FIG. 12, management system 1702 may be configured to collect data from various data collection devices 1704 through a data collection interface 1706. As discussed above, management system 1702 may include one or more computers and/or servers or any combination thereof. Data collection devices 1704 may include, but are not limited to, user devices (including provider and requester computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1706 can include, e.g., an extensible device framework configured to support interfaces for each data collection device. In various embodiments, data collection interface 1706 may be extended to support new data collection devices as they are released and/or to update existing interfaces to support changes to existing data collection devices. In various embodiments, data collection devices may communicate with data collection interface 1706 over one or more networks. The networks may include any network or communication protocol as would be recognized by one of ordinary skill in the art, including those networks discussed above.

As shown in FIG. 12, data received from data collection devices 1704 can be stored in data store 1708. Data store 1708 may include one or more data stores, such as databases, object storage systems and services, cloud-based storage services, and other data stores. For example, various data stores may be implemented on a non-transitory storage medium accessible to management system 1702, such as historical data store 1710, ride data store 1712, and user data store 1714. Data stores 1708 can be local to management system 1702, or remote and accessible over a network, such as those networks discussed above or a storage area network or other networked storage system. In various embodiments, historical data 1710 may include historical traffic data, weather data, request data, road condition data, or any other data for a given region or regions received from various data collection devices. Ride data store 1712 may include route data, request data, timing data, and other ride related data, in aggregate and/or by requester or provider. User data 1714 may include user account data, preferences, location history, and other user-specific data. Although certain data stores are shown by way of example, any data collected and/or stored according to the various embodiments described herein may be stored in data stores 1708.

As shown in FIG. 12, an application interface 1716 can be provided by management system 1702 to enable various apps 1718 to access data and/or services available through management system 1702. Apps 1718 may run on various user devices (including provider and requester computing devices, such as those discussed above) and/or may include cloud-based or other distributed apps configured to run across various devices (e.g., computers, servers, or combinations thereof). Apps 1718 may include, e.g., aggregation and/or reporting apps which may utilize data 1708 to provide various services (e.g., third-party ride request and management apps). In various embodiments, application interface 1716 can include an API and/or SPI enabling third party development of apps 1718. In some embodiments, application interface 1716 may include a web interface, enabling web-based access to data 1708 and/or services provided by management system 1702. In various embodiments, apps 1718 may run on devices configured to communicate with application interface 1716 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally, or alternatively, without limitation to transportation services, a matching system for any service may facilitate the fulfillment of requests using both human drivers and autonomous vehicles.

The computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that embodiments of an electric vehicle may include at least one non-transitory computer-readable storage medium (e.g., a computer memory, a portable memory, a compact disk, etc.) encoded with a computer program (i.e., a plurality of instructions), which, when executed on a processor, performs one or more of the above-discussed functions. Those functions, for example, may include control of the motor driving a wheel of the vehicle, receiving and processing control signals from a central server, and/or displaying information to a user. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A micromobility vehicle, comprising:
a footboard having a bottom portion configured to extend between a front wheel and a rear wheel and an angled portion extending at an angle from the bottom portion of the footboard;
a frame disposed at an edge of the angled portion of the footboard, such that the angled portion of the footboard is recessed below a top edge of the frame so as to cause the top edge of the frame to create a raised rim with respect to the footboard, wherein the frame includes a column extending from the angled portion of the footboard toward handlebars of the micromobility vehicle, and wherein the raised rim is curved around the angled portion of the footboard; and
a hook disposed on the column;
wherein the column, the angled portion of the footboard, and the hook at least partially define a front storage volume of the micromobility vehicle.

2. The micromobility vehicle of claim 1, wherein the front storage volume is further defined by a plane extending from the hook to an intersection between the bottom portion of the footboard and the angled portion of the footboard.

3. The micromobility vehicle of claim 1, wherein the hook is configured to retain a personal item placed on the hook.

4. The micromobility vehicle of claim 1, wherein the hook is configured to retract into the column when no personal item is placed on the hook.

5. The micromobility vehicle of claim 1, wherein the footboard further includes a curved portion extending from the bottom portion of the footboard, wherein the frame includes a seat post that extends from the curved portion of the footboard toward a seat of the micromobility vehicle, and wherein the curved portion of the footboard and seat post define a rear storage volume of the micromobility vehicle.

6. The micromobility vehicle of claim 5, wherein a plane extending from the hook to an intersection between the bottom portion of the footboard and the angled portion of the footboard defines a side of the rear storage volume.

7. The micromobility electric of claim 1, wherein the footboard further includes a rear angled portion extending from the bottom portion of the footboard, wherein the frame includes a seat post that extends from the rear angled portion of the footboard toward a seat of the vehicle, and wherein the rear angled portion of the footboard and seat post define a rear storage volume of the electric vehicle.

8. The micromobility vehicle of claim 7, further comprising a rear hook disposed on the seat post, wherein a plane extending from the rear hook to an intersection between the bottom portion of the footboard and the rear angled portion of the footboard defines a side of the rear storage volume.

9. The micromobility vehicle of claim 1, further comprising an elastic member that spans the front storage volume.

10. The micromobility vehicle of claim 9, wherein the elastic member is connected at a first end to a first side of the frame adjacent to the angled portion of the footboard and is connected at a second end to a second, opposite side of the frame adjacent to the angled portion of the footboard.

11. The micromobility vehicle of claim 10, wherein the elastic member is configured to apply a force to an object positioned between the elastic member and the angled portion of the footboard.

12. The micromobility vehicle of claim 1, further comprising a cargo net that spans the front storage volume.

13. The micromobility vehicle of claim 1, further comprising a retainer spanning the front storage volume, the retainer comprising:
an elastic member comprising: a first end coupled to the frame, a second end coupled to the frame, and an intermediate portion connecting the first end and the second end,
a housing, and
at least two pins within the housing, wherein the intermediate portion of the elastic member passes over the at least two pins such that the intermediate portion is disposed in a serpentine path within the housing.

14. The micromobility vehicle of claim 13, wherein the housing is rigid.

15. The micromobility vehicle of claim 13, wherein the at least two pins includes a first pin and a second pin, wherein the housing includes an internal volume extending along a longitudinal axis of the housing defined by opposing openings formed in the housing, wherein the first pin and the second pin span the internal volume.

16. The micromobility vehicle of claim 15, wherein the first pin extends through the internal volume near a first opening of the housing in a direction transverse to the longitudinal axis of the housing, and wherein the second pin extends through the internal volume near a second opening of the housing.

17. The micromobility vehicle of claim 16, wherein the elastic member is routed through the first opening, around the second pin, back toward the first opening, around the first pin, and through the second opening.

18. The micromobility vehicle of claim 13, wherein the first end is coupled to the frame at a first location adjacent the angled portion of the footboard, and the second end is coupled to a second location adjacent the angled portion of the footboard on an opposite side of the angled portion of the footboard.

19. The micromobility vehicle of claim 18, wherein the housing is configured to apply a force to an object in a direction of the angled portion of the footboard when the object is positioned between the footboard and the housing.

20. The micromobility vehicle of claim 13, wherein the intermediate portion doubles back on itself at least twice inside the housing.

21. A micromobility vehicle, comprising:
a footboard having a bottom portion configured to extend between a front wheel and a rear wheel and a rear portion extending from the bottom portion of the footboard; and
a frame disposed at an edge of the rear portion of the footboard, such that the rear portion of the footboard is recessed below a top edge of the frame so as to cause the top edge of the frame to create a raised rim with respect to the footboard, wherein the frame includes a seat post, wherein the rear portion of the footboard extends from the bottom portion of the footboard to the seat post, wherein the seat post extends from the rear portion of the footboard toward a seat of the micromobility vehicle, and wherein the raised rim is curved around the rear portion of the footboard;
wherein the rear portion of the footboard and the seat post at least partially define a rear storage volume of the micromobility vehicle.

22. The micromobility vehicle of claim 21, wherein the rear portion of the footboard is curved.

23. The micromobility vehicle of claim 21, wherein the rear portion of the footboard is angled relative to the bottom portion of the footboard.

24. The micromobility vehicle of claim 21, wherein the seat post includes a first seat post portion and a second seat post portion separated by an open space.

25. The micromobility vehicle of claim 24, wherein the rear portion of the footboard is positioned in the open space between the first seat post portion and the second seat post portion.

26. The micromobility vehicle of claim 21, further comprising a hook disposed on the seat post, wherein a plane extending from the hook to an intersection between the bottom portion of the footboard and the rear portion of the footboard defines a side of the rear storage volume.

27. The micromobility vehicle of claim 21, further comprising a hook disposed on the seat post and configured to retain a personal item placed on the hook.

28. The micromobility vehicle of claim 21, further comprising an elastic member that spans the rear storage volume.

29. The micromobility vehicle of claim 28, wherein the elastic member is connected at a first end to a first side of the frame adjacent to the rear portion of the footboard and is connected at a second end to a second, opposite side of the frame adjacent to the rear portion of the footboard.

30. The micromobility vehicle of claim 21, further comprising a cargo net that spans the rear storage volume.

\* \* \* \* \*